Dec. 12, 1950  G. K. RAIDER  2,533,690
GERMICIDAL LIGHT ARRANGEMENT FOR VENTILATED SPACE
Filed May 3, 1949
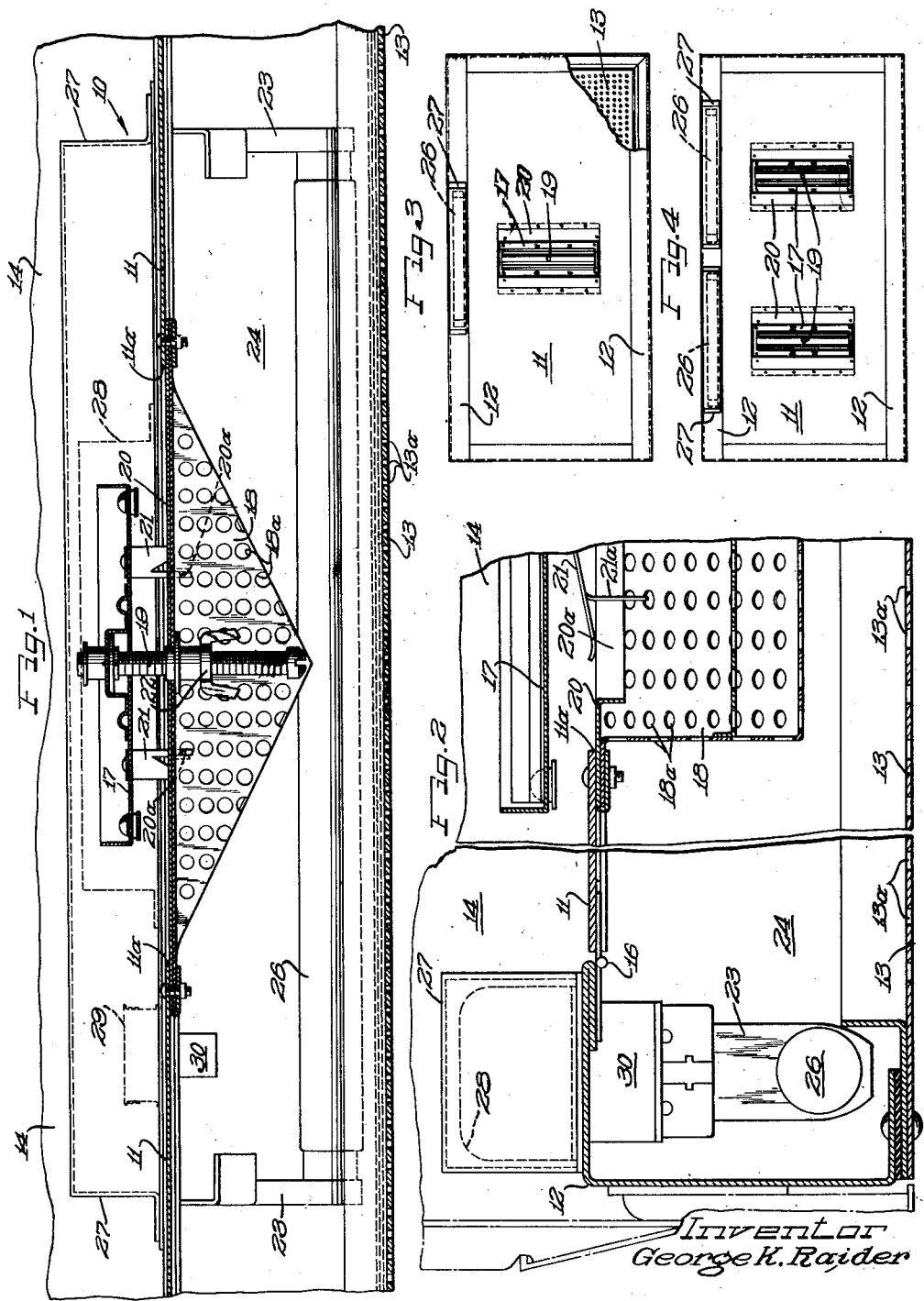
Inventor
George K. Raider
By The Firm of Charles W. Hills Attys Patented Dec. 12, 1950

2,533,690

UNITED STATES PATENT OFFICE 2,533,690

GERMICIDAL LIGHT ARRANGEMENT FOR VENTILATED SPACE

George K. Raider, Chicago, Ill., assignor to The Pyle-National Company, Chicago, Ill., a corporation of New Jersey Application May 3, 1949, Serial No. 91,204

1 Claim. (Cl. 21—74)

This invention relates to an improved arrangement for installing electrical apparatus having germicidal properties in a ventilating system, and particularly in a ventilating system for a railway car or the like.

It has become well known that lamps having certain types of bulbs affixed therein are useful in destroying harmful bacteria. To that end, germicidal lamps have heretofore been provided which supply cold-cathode discharges in a low-pressure mercury vapor. Thus, a radiation is obtained which, when controlled within a long tube of special ultra-violet-transmitting glass, may be employed in sterilizing the air in hospital operating rooms, nurseries and air-conditioning systems, as well as drinking vessels in restaurants and soda fountains. Lamps having these characteristics are available in a variety of sizes on the commercial market and are usually operated in series on the secondary circuits of high-voltage transformers.

In accordance with this invention, the problem of sterilizing air in a ventilating system for a railway car or other large room areas has been satisfactorily and economically solved by utilizing a certain form of ventilating arrangement for distributing the radiation from one or more germicidal lamps throughout a portion of the ventilating system wherein air movements are restricted to comparatively low velocities.

In particular, this invention provides an unusually desirable result when employed in conjunction with ventilating systems of the type employing equipment for delivering conditioned or unconditioned air to occupied spaces and functioning on the so-called pressure-displacement principle.

Structures for ventilating systems falling into this general classification are disclosed in the U. S. Patents Nos. 2,172,771 to Norris; 2,251,682 to Leadbetter; and 2,304,628 to Damerel.

In the ventilating structures which function on the pressure displacement principle, the distribution of ventilating air throughout a room area, such as the interior of a railway car, is accomplished in such a manner as to provide a substantially uniform distribution of ventilating air throughout the entire room area without producing any detectable drafts. Air is delivered at a very low velocity and is widely diffused at a uniform temperature.

By incorporating one or more germicidal lamps in the low velocity path of the ventilating air streams, yet located exteriorly of the room area serviced by the ventilating system, the present invention accomplishes an adequate sterilization of the ventilating air stream with a high degree of efficiency and provides for the distribution of sterilized air throughout an entire room area with a much smaller amount of germicidal lamp units than has heretofore been possible.

Accordingly, it is an object of this invention to provide an improved germicidal lamp arrangement for ventilated spaces, particularly for railway cars or similar room areas having ventilating arrangements for producing a uniform flow of ventilated air throughout the entire interior of a room area.

A particular object of this invention is to provide an improved germicidal lamp arrangement for a ventilating system wherein the entire interior of a space to be ventilated may be supplied with a substantially uniform flow of sterilized air through the utilization of at least one germicidal lamp for each control panel unit in a ventilating system of the general type described by way of example herein.

Another object of this invention is to provide a germicidal lamp arrangement for a ventilating system which attains improved sterilization efficiency and permits the construction of a compact self-contained ventilating unit capable of furnishing germicidally-treated air to an occupied space without direct radiation on the occupants.

The specific nature of this invention, as well as other objects and advantages thereof, will become apparent to those skilled in the art from the following detailed description taken in conjunction with the annexed sheet of drawings which, by way of preferred example only, illustrates a preferred embodiment of my invention.

On the drawings:

Figure 1 is a partial, cross-sectional view taken approximately upon a vertical center line of a ventilating system structure incorporating the germicidal lamp arrangement contemplated by my invention;

Figure 2 is a partial transverse sectional view of the ventilating system structure shown in Figure 1;

Figure 3 is a somewhat diagrammatic view partly broken away of a panel unit in a ventilating system incorporating the germicidal lamp arrangement contemplated by my invention; and Figure 4 is a partial plan view illustrating a modification of a panel unit in a ventilating system incorporating the germicidal lamp arrangement contemplated in my invention.

As shown on the drawings:

While the drawings and the following description will refer to the installation of this invention in a ventilating system of a particular type, it is to be distinctly understood that the invention is in no way limited to the specific application of a germicidal lamp arrangement to a railway car ventilating system but may easily be applied to a ventilating system adapted for architectural uses, such as may be appropriate for installation in auditoriums or other rooms and spaces. Hence, the principle of this invention may be applied to any ventilating system which functions on the pressure displacement principle or which has the general characteristics hereinafter set forth.

The ventilating system structure illustrated herein comprises ceiling panels of a design having the general characteristics disclosed in the previously acknowledged patents and, as such, may include panel units which may be mounted in a ceiling structure having a duct or plenum chamber above.

A typical panel unit is indicated generally by the reference numeral 10 and is shown as including a control plate 11, a panel frame 12 (Figure 2) and perforated distribution plate 13.

The control plate 11, which is the upper portion of the assembly, is framed by the main supporting member of the panel frame 12 which, in turn, may be mounted along its edge to the roof structure 14 of a railway car. In this manner, the panel unit 10 is installed in a part of the ceiling of the car interior and forms the lower side of a supply duct or plenum chamber in the roof of the car.

It will be readily understood that a number of panel units 10 may be placed along the length of the entire car or, if adapted for architectural applications, the panel units 10 may be spaced along the floor of a ventilating duct as often as may be necessary to adequately ventilate any specific room area.

As will be noted on Figure 2, the control panel 11 may be hinged as at 16 to the panel frame 12 to allow for simple and economical servicing operations. Thus, the distribution plate 13 may be lowered to give quick access to the panel unit 10 and lowering of the control plate 11 gives access to the interior of the duct or plenum chamber for cleaning or other servicing.

A valve is mounted in the center of the control plate 11 and consists of an adjustable valve plate 17 which is in control of a primary distribution section defined by one or more large perforations 11a formed in the control panel 11. A diffusion element 18 may be affixed by flanged edge portions to the control plate 11 at the edge of the perforations 11a.

The valve is further provided with a threaded shaft or spindle 19 which is supported by a valve frame element 20 and is attached to the valve plate 17.

The valve frame element 20 may be so constructed as to divide the primary distribution section formed by the perforation 11a into one or more openings leading to the diffusion elements 18.

In the present embodiment, it is contemplated that the control plate 11 defines one perforation 11a, and the frame element 20 fitted therein defines a pair of openings 20a which may be formed by flaring down portions of the frame element 20.

The diffusion elements 18, for such an arrangement, define two V-shaped troughs which are disposed immediately below the openings 20a. Both the sides and the ends of the troughs formed in the diffusion elements 18 may be perforated as at 18a.

A pair of springs 21 are provided on each end of the adjustable valve plate 17 and maintain a tension on the plate 17 so that rotation of the threaded spindle 19 will result in a vertical adjustment of the valve plate 17 relative to the openings 20a formed in the valve frame element 20. It will be understood that the rate of air flow from the duct or plenum chamber through the valve and hence the control plate may be controlled by positioning the valve plate 17 in vertical adjustment and selected positions may be locked by tightening the locking nut 22. Each spring 21 may be provided with depending legs 21a which serve to guide the adjustable valve plate 17 in its vertical path.

The distribution plate 13 may be mounted in any convenient manner to form the ceiling of the room area as well as the bottom of the panel unit 10. Each distribution plate 13 is preferably constructed of a perforated sheet-like material having a diffusion portion defining a large number of spaced perforations 13a surrounded by imperforate marginal portions which may be connected to the panel frame 12 by any suitable fastening means such as the rivets shown in Figure 2. Thus, the controlled rate of flow of ventilating air passing through the openings 20a and through the diffusion elements 18 is further diffused by passage through the perforations 13a of the distributing plate 13.

The construction thus far described represents a well-known form of ventilating arrangement which has found wide application in railway cars and similar ventilated enclosures. In accordance with this invention, advantage is taken of the uniform air distributing characteristics of the aforedescribed ventilating arrangement to provide a unique adaptation of germicidal lamps thereto.

In attempting to gain the sterilization advantages of a germicidal lamp in a ventilating system, those versed in the art have heretofore attempted to expose the stream of air to the radiation of a germicidal lamp as such stream of ventilating air is emitted from a blower or as such air passes through a distribution duct similar to that shown and identified as the distributing duct or plenum chamber formed in the ceiling structure 14 by the panel unit 10.

It has been found that such an arrangement is frequently unsatisfactory due to the fact that the flow of air moving therethrough is subjected to high velocities and therefore does not experience a sufficient exposure to the radiation effects of a germicidal lamp as to render such ventilating air free of possible harmful bacteria.

In accordance with this invention, one or more germicidal lamp units are mounted in predetermined spaced relationship between the control panel 11 and the distributing plate 13 adjacent the adjustable valve unit and behind the imperforate marginal portions of the distributing plate 13. By so mounting the germicidal lamp units, it has been found that the radiation emitting therefrom is especially effective inasmuch as the flow of air between the adjustable valve unit and the distributing plate 13 is not subjected to high velocities.

This is a desirable result inasmuch as all of the ventilating air which is intended to ultimately reach the room or area below the distribution plate 13 is adequately exposed to the radiation of the germicidal lamp and, therefore, is relatively free from possible harmful bacteria before delivery.

Panel units for ventilating systems operating on the pressure displacement principle, as herein described, are frequently manufactured in varying sizes. Thus, as may be seen by making reference to Figures 1 and 2, the spacing of a germicidal lamp unit may be accomplished by placing a lamp frame 23 in depending relation with the panel frame 12. The panel frame 12, in this particular embodiment, extends longitudinally of the panel unit 10 and, as may be readily evident upon making reference to Figure 2, provides a supporting means for the imperforate marginal portions of the distributing plate 13 so as to space the plate 13 away from the control plate 11 and the diffusion element 18.

For the sake of convenience, the low velocity area between the control plate 11 and the distributing plate 13 may be hereinafter referred to as a secondary plenum chamber 24.

The lamp frame 23 is situated in such a manner as to place a pair of sockets in spaced alignment relative to the adjustable valve unit, so that a bulb 26 placed in the germicidal lamp unit will lie in spaced alignment relative to the adjustable valve unit. The germicidal lamp unit is also closely spaced to the side walls of the panel frame 12 so as to lie behind the lower flange of the panelframe 12 and the imperforate marginal portions of the distributing plate 13. The angular disposition of the lamp 26 with respect to the diffusion portion of the distributing plate 13 is such that none of the rays emitted therefrom will pass directly through the perforations 13a.

A cover 27 may be mounted on the upper side of the panel frame 12 so as to provide an enclosure for suitable elements usually associated with a germicidal type lamp, such as a ballast 28, a starter socket 29, and a starter 30.

As will be evident upon referring to Figure 3, the instant arrangement places the germicidal lamp unit in spaced longitudinal alignment relative to the given air outlet and also spaces the unit in lateral proximity thereto so as to render the germicidal lamp unit especially effective in exposing the low velocity air passing through the secondary plenum chamber 24 to the germ-killing effects of the lamp.

Figure 4 shows how the principle of the instant arrangement may be carried out when a ventilating panel unit is provided with a plurality of air outlets.

It should be further noted that the arrangement of the germicidal lamp in the manner described has the further advantage of making the location of the lamp impossible to observe from the interior of the space being served by the ventilating system. Thus, no special mounting arrangements are required and the design considerations need not be sacrificed. It will be understood that this arrangement lends itself to an economical construction which completely eliminates the necessity of providing fancy lamp receptacles disposed in the interior of the room or space.

Another notable advantage of the instant arrangement is that the bulbs 26 of the germicidal lamp units are contained within the body of each panel unit 10, thereby eliminating direct ray radiation upon the occupants of the space being served by the ventilating system. It will readily be understood by those versed in the art that the radiation of a germicidal lamp is injurious to the eyes and the skin and the present arrangement advantageously eliminates direct radiation and thereby precludes the possibility of producing an erythemic effect on the skin.

Accordingly, it will be apparent to those versed in the art that this invention provides a greatly improved germicidal lamp arrangement for ventilated spaces and, in the particular application of this arrangement to a railway car, will provide for the uniform distribution of germicidaly treated air throughout the entire car.

It will, of course, be understood that various details of construction may be modified through a wide range without departing from the principles of this invention, and it is, therefore, not the purpose to limit the patent granted hereon to the specific embodiments herein shown by way of illustrative example.

I claim as my invention:

In a ventilating system for a room for human occupancy including primary and secondary plenum ducts, valve means for controlling the flow of air from said primary to said secondary plenum duct to maintain a uniform low pressure and reduced velocity of air therein, and a plate between said secondary plenum duct and said room having a multitude of small perforations for the distribution of air therethrough into said room and having marginal imperforate portions, the improvement whereby the air in said secondary plenum duct is germicidally treated while at a low pressure and a low velocity and just prior to distribution through said perforated plate, which improvement comprises a germicidal lamp disposed in closely spaced relation to one of said imperforate marginal portions along the length thereof, the spacing and angular relationship to the perforated portion of said plate being such that said lamp effectively irradiates the space within said secondary plenum duct with no possibility of emitted rays passing directly through any of said perforations and thus irradiating humans within said room.

GEORGE K. RAIDER.

REFERENCES CITED

The following references are of record in the file of this patent:

UNITED STATES PATENTS

| Number | Name | Date |
| --- | --- | --- |
| 2,150,263 | Chesney | Mar. 14, 1939 |
| 2,218,190 | Anderson | Oct. 15, 1940 |
| 2,234,037 | Anderson | Mar. 4, 1941 |
| 2,248,618 | Fischer | July 8, 1941 |
| 2,335,056 | Grison | Nov. 23, 1943 |
| 2,348,486 | McCrosson | May 9, 1944 |
| 2,359,021 | Campbell et al. | Sept. 26, 1944 |
| 2,413,704 | Glattiler et al. | Jan. 7, 1947 |
| 2,472,243 | Berryman | June 7, 1949 |